F. F. TURNER.
WHEAT HEATER, GRAIN DRIER, AND CONDITIONER.
APPLICATION FILED MAY 1, 1912.
1,052,390.
Patented Feb. 4, 1913.
2 SHEETS—SHEET 1.
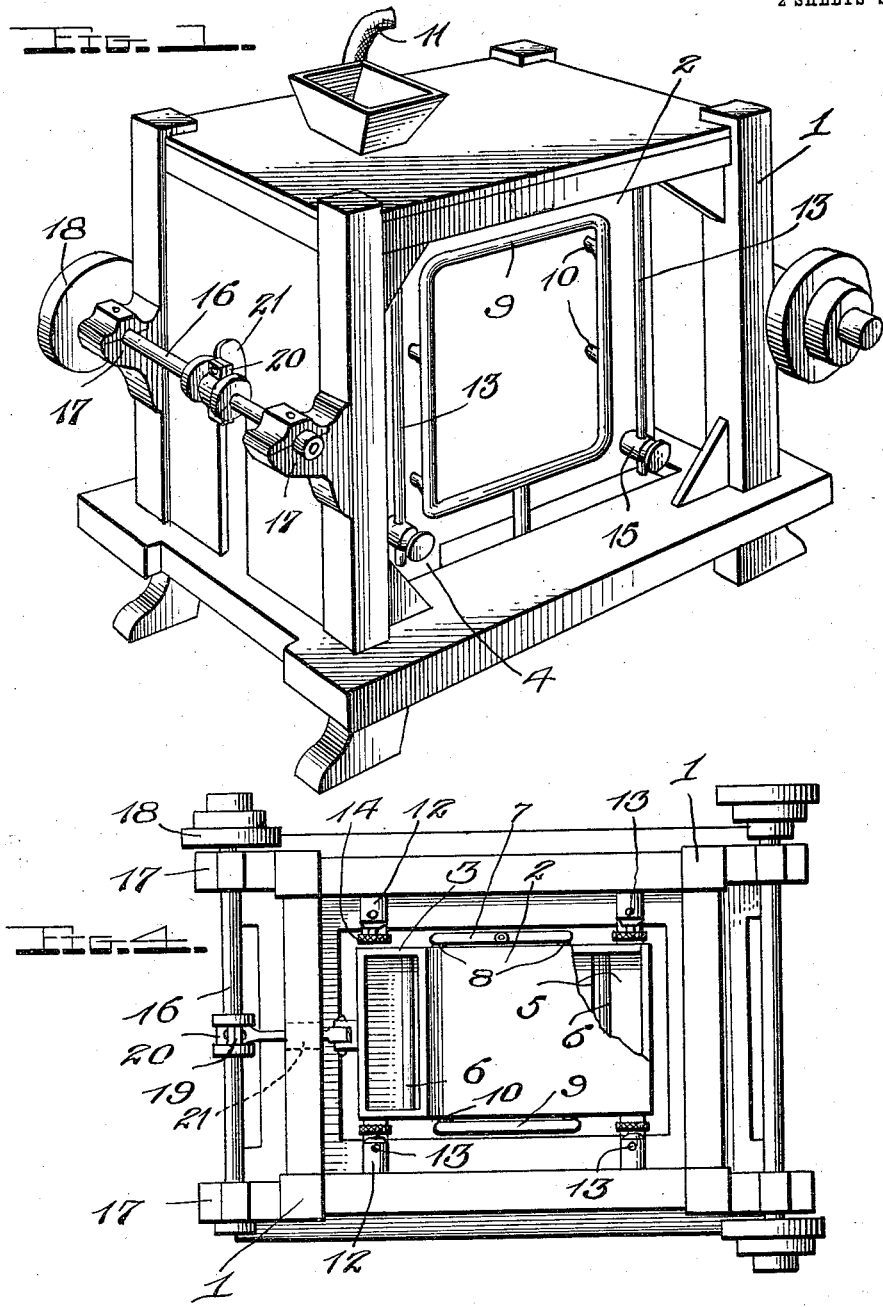
Witnesses
Chas. L. Griesbauer.
A. B. Norton.
Inventor
F. F. Turner,
By Watson E. Coleman
Attorney F. F. TURNER.
WHEAT HEATER, GRAIN DRIER, AND CONDITIONER.
APPLICATION FILED MAY 1, 1912.
1,052,390.
Patented Feb. 4, 1913.
2 SHEETS—SHEET 2.
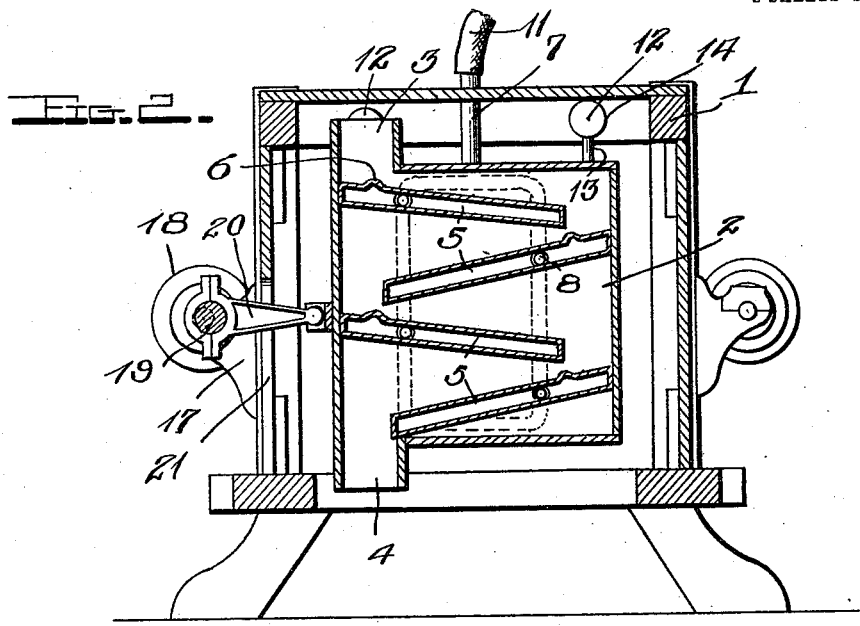
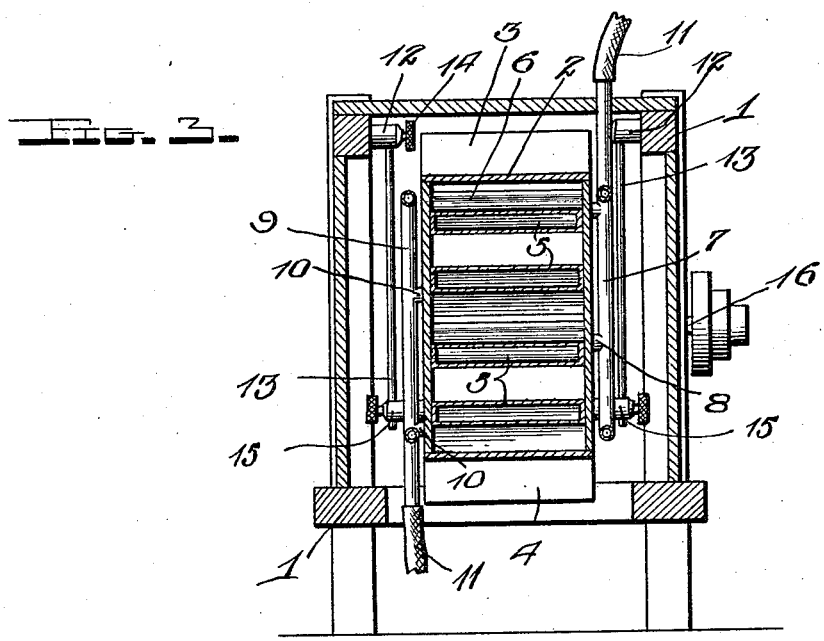
Inventor
F. F. Turner,
Witnesses
Chas. L. Griesbauer.
A. B. Norton.
By Watson E. Coleman
Attorney

UNITED STATES PATENT OFFICE.

FRANK F. TURNER, OF LITTLE FALLS, MINNESOTA.

WHEAT-HEATER, GRAIN-DRIER, AND CONDITIONER.

1,052,390.

Specification of Letters Patent.

Patented Feb. 4, 1913.

Application filed May 1, 1912. Serial No. 694,501.

*To all whom it may concern:*

Be it known that I, FRANK F. TURNER, a citizen of the United States, residing at Little Falls, in the county of Morrison and State of Minnesota, have invented certain new and useful Improvements in Wheat-Heaters, Grain-Driers, and Conditioners, of which the following is a specification, reference being had to the accompanying drawings.

This invention relates to new and useful improvements in grain driers and has for its object to provide an improved device of this character wherein steam is provided as a means for the drying of the grain.

A further object of the invention resides in providing a casing or housing having a series of pans alternately inclined in opposite directions, said pans having hollow portions for the reception of steam, and still another object resides in the oscillation of the casing or housing carrying this series of pans.

Another object resides in providing a device which is extremely simple and durable in construction, inexpensive to manufacture and one which will be very efficient and useful in operation.

With these and other objects in view, the invention consists in the novel features of construction, combination and arrangement of parts as will be hereinafter referred to and more particularly pointed out in the specification and claims.

In the accompanying drawings forming a part of this application, Figure 1 is a perspective view of the device having the wall of the outer frame, nearest the observer, removed. Fig. 2 is a vertical longitudinal section through the device. Fig. 3 is a vertical transverse section therethrough. Fig. 4 is a plan view of the device partly in section.

In describing my invention, I shall refer to the drawings in which similar reference characters designate corresponding parts throughout the several views and in which 1 indicates an outer frame or housing within which is adapted to be disposed my improved grain drying and steaming chamber. This chamber comprises a housing or casing 2 having the inlet and outlet openings 3 and 4 respectively provided at the upper and lower portions of the same and mounted in said housing is a series of hollow pans or the like 5 which are disposed one above the other and are alternately inclined in opposite directions. The inlet opening 3 of the housing communicates with the upper portion of the upper inclined pan 5, while the outlet opening 4 is positioned immediately below the lower portion of the lowermost of said pans 5, whereby grain may be entered from a hopper or the like through the inlet opening to each successive pan and be finally passed to the outlet opening 4 and in order to cause the grain to be turned as the same passes over the upper faces of the inclined pans, each of said pans is provided adjacent its upper or inner portion with one or more corrugations 6.

As stated, the pans 5 are hollow in design, the grain passing over the top face thereof, and disposed on one side of the chamber 2 is a steam inlet pipe 7, which has a plurality of branch pipes 8 formed thereon which is disposed laterally thereof and extended beyond the wall of the chamber to enter the various hollow pans 5 adjacent their upper inclined ends. Disposed on the opposite side of the housing or casing 2, is an outlet steam pipe 9 which communicates through the medium of a plurality of branches 10 with the opposite sides of the hollow pans 5 adjacent the lower inclined ends thereof. The ends of these steam pipes 7 and 9 having engaged therewith the flexible connections 11, which respectively lead to a source of supply and exhaust outlet. The steam, under pressure flowing through the pans 5 will, of course, have a tendency to dry the grain as the same passes over the upper faces of said pans. As stated above, this chamber 2 is disposed within the frame or outer casing 1 and in order to provide for the suspension of the same to permit oscillation thereof, the inner side faces of the upper portion of said frame are provided with sockets 12 which receive therein, the suspension rods 13, which are formed of spring metal, said rods being held to the sockets by means of the adjusting screws 14. Similar sockets 15 are provided on the outer faces of the chamber 2 adjacent the lower ends thereof, said sockets receiving in adjustable engagement therewith, the lower ends of said suspension rods 13, and from this construction it will be seen that said housing of casing 2 may be suspended within the frame 1 and be permitted to oscillate therewithin.

In order to provide for the oscillation of the chamber within the outer housing or casing 1, so that the grain passed therein may readily pass from one pan to the other, a shaft 16 rotatably mounted in bearings 17, on one wall of the frame 1, has a pulley 18 carried at one end thereof which communicates with any desired source of power. This shaft 16 has a crank 19 formed thereon which connects with one end of a pitman 20, said pitman extending through a slot 21 in the adjacent wall of the frame or housing 1 and the opposite end of said pitman is pivotally engaged in a bearing or the like on the one end wall of the housing 2, wherein it will be appreciated that as the shaft 16 is rotated, said casing 2 will be oscillated within the frame 1.

From the foregoing description of the construction of my device, the operation thereof will be readily understood and it will be seen that I have provided a simple and efficient device which is extremely durable in construction and inexpensive to manufacture.

While I have particularly described the elements most well adapted to perform the functions set forth, it is obvious that various changes in form, proportion and in the minor details of construction may be resorted to without departing from the spirit or sacrificing any of the principles of the invention.

Having thus described my invention, what I claim is:—

1. A grain drier comprising a main frame, a housing, means for oscillating said housing, a plurality of hollow pans mounted within said housing, the pans being alternately inclined in opposite directions and having their corresponding side faces formed adjacent their upper ends with intake openings, the opposite side faces of said pans being formed adjacent their lower ends with outlet openings, means connected with said intake openings to supply a heating medium directly to each pan, and means connected with said outlet openings for withdrawing said heating medium.

2. A grain drier of the class described, comprising a plurality of hollow pans, means for oscillating said pans the pans being oppositely inclined in opposite directions and having their corresponding side faces formed with intake openings adjacent the upper ends thereof, the opposite side faces of said pans being formed adjacent their lower ends with exhaust openings, a supply pipe having a plurality of lateral projections, each of said projections communicating with one of said intake openings, and an exhaust pipe formed with a plurality of lateral projections, each of said last mentioned projections communicating with one of the aforementioned exhaust openings, for the purpose specified.

In testimony whereof I hereunto affix my signature in the presence of two witnesses.

FRANK F. TURNER.

Witnesses:
L. V. TANNER,
EDW. A. BERG.

---

Copies of this patent may be obtained for five cents each, by addressing the "Commissioner of Patents, Washington, D. C."